(12) United States Patent
Hornkvist et al.

(10) Patent No.: US 9,058,124 B2
(45) Date of Patent: Jun. 16, 2015

(54) DIRECTORY TREE SEARCH

(75) Inventors: John M. Hornkvist, Cupertino, CA (US); Eric R. Koebler, Aptos, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 13/350,634

(22) Filed: Jan. 13, 2012

(65) Prior Publication Data

US 2012/0179689 A1     Jul. 12, 2012

Related U.S. Application Data (60) Provisional application No. 61/433,177, filed on Jan. 14, 2011.

(51) Int. Cl.
| | |
|---|---|
| G06F 17/30 | (2006.01) |
| G06F 3/06 | (2006.01) |
| G06F 11/30 | (2006.01) |
| H04L 12/24 | (2006.01) |
| H04L 29/08 | (2006.01) |

(52) U.S. Cl.
CPC ............ G06F 3/0665 (2013.01); G06F 3/0605 (2013.01); G06F 3/067 (2013.01); G06F 11/3034 (2013.01); G06F 11/3055 (2013.01); H04L 41/046 (2013.01); H04L 41/0806 (2013.01); H04L 41/0886 (2013.01); H04L 67/1097 (2013.01)

(58) Field of Classification Search
CPC .................... G06F 17/30091; G06F 17/30067; G06F 17/30011; G06F 17/30094; G06F 17/30616; G06F 17/30979; Y10S 707/99931; Y10S 707/99933; Y10S 707/917; Y10S 707/956; Y10S 707/971

USPC .......... 707/741, 736, 776, 811, 999.001, 705, 707/706, 722, 769, 797
See application file for complete search history.

(56) References Cited

U.S. PATENT DOCUMENTS

| | | | |
|---|---|---|---|
| 6,098,066 A * | 8/2000 | Snow et al. ............................ 1/1 |
| 7,085,766 B2 * | 8/2006 | Keith, Jr. ............................... 1/1 |
| 7,634,468 B2 | 12/2009 | Stephan | |
| 7,698,328 B2 | 4/2010 | Sachs et al. | |
| 7,765,213 B2 | 7/2010 | Loofbourrow et al. | |
| 7,774,326 B2 * | 8/2010 | Arrouye et al. ............... 707/705 |
| 7,783,589 B2 | 8/2010 | Hornkvist et al. | |
| 7,917,516 B2 | 3/2011 | Loofbourrow et al. | |
| 8,612,412 B2 * | 12/2013 | Clark et al. ................... 707/706 |
| 2005/0187946 A1 * | 8/2005 | Zhang et al. ................... 707/100 |
| 2006/0117049 A1 * | 6/2006 | Jain et al. ....................... 707/101 |
| 2006/0129584 A1 * | 6/2006 | Hoang et al. ................... 707/101 |
| 2007/0118561 A1 * | 5/2007 | Idicula et al. ............... 707/104.1 |
| 2007/0162580 A1 * | 7/2007 | Clemm et al. ............... 709/223 |
| 2007/0192293 A1 | 8/2007 | Swen | |
| 2010/0161623 A1 * | 6/2010 | Torbjornsen ................... 707/754 |
| 2010/0211572 A1 | 8/2010 | Beyer et al. | |
| 2010/0241662 A1 * | 9/2010 | Keith, Jr. ....................... 707/770 |
| 2011/0137963 A1 * | 6/2011 | Hoang et al. ................... 707/822 |
| 2011/0213783 A1 * | 9/2011 | Keith, Jr. ....................... 707/741 |

* cited by examiner

*Primary Examiner* — Dennis Truong
(74) *Attorney, Agent, or Firm* — Blakely, Sokoloff, Taylor & Zafman LLP (57) ABSTRACT

Directory tree searching uses a path index to determine a set of documents for a directory path portion of a search query. The set of documents for the directory path portion is evaluated with a set of document for an indexed term portion of the search query to determine common documents.

23 Claims, 8 Drawing Sheets

| TERMID 401 | DOCID 403 |
|---|---|
| 12 | 104, 105, 106 |
| 29 | 104, 106 |

| Directory OID 501 | DOCID 503 | Child OIDs 505 |
|---|---|---|
| 10 | 104, 105 | 22 |
| 20 | 106 | -- |
| 22 | -- | -- |

| Directory OID 601 | New path 603 | Old path 605 |
|---|---|---|
| 22 | /usrs/foo/pix | /usrs/john/pix |

| Directory OID 601 | New path 611 | Old path 613 |
|---|---|---|
| 22 | 22/20/5/2 | 22/10/5/2 |

| OID 801 | Parent OID 803 |
|---|---|
| 5 | 2 |
| 10 | 5 |
| 20 | 5 |
| 22 | 10 |

| OID 901 |
|---|
| 22 |
| 10 |
| 5 |
| 2 |

DIRECTORY TREE SEARCH

RELATED APPLICATIONS

This application claims priority to U.S. Provisional Application 61/433,177, filed Jan. 14, 2011, which is hereby incorporated by reference.

FIELD OF THE INVENTION

This invention relates generally to searching of data processing files, and more particularly to searching within file system directory trees.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright © 2010, Apple Inc., All Rights Reserved.

BACKGROUND

Modern data processing systems, such as general purpose computer systems, allow the users of such systems to create a variety of different types of data files. For example, a typical user of a data processing system can create text files with a word processing program or can create an image file with an image processing program. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. Typically, file management systems include a searching function which allows a user to search for flies by various criteria, such as a term in a file, and also allow the user to limit the search to a particular directory.

Searching through hundreds, if not thousands, of files for a particular term is resource intensive, so most file management systems index at least some of the terms in files for faster searching. However, determining whether a file containing a particular term is in a specified directory requires calls to the underlying operating system, which slows the search.

SUMMARY

Directory tree searching uses a path index to determine a set of documents for a directory path portion of a search query. The set of documents for the directory path portion is evaluated with a set of document for an indexed term portion of the search query to determine common documents.

DETAILED DESCRIPTION

In the following detailed description of embodiments of the invention, reference is made to the accompanying drawings in which like references indicate similar elements, and in which is shown by way of illustration specific embodiments in which the invention can be practiced. These embodiments are described in sufficient detail to enable those skilled in the art to practice the invention, and it is to be understood that other embodiments can be utilized and that logical, mechanical, electrical, functional and other changes can be made without departing from the scope of the present invention. The following detailed description is, therefore, not to be taken in a limiting sense, and the scope of the present invention is defined only by the appended claims.

Figure 1:
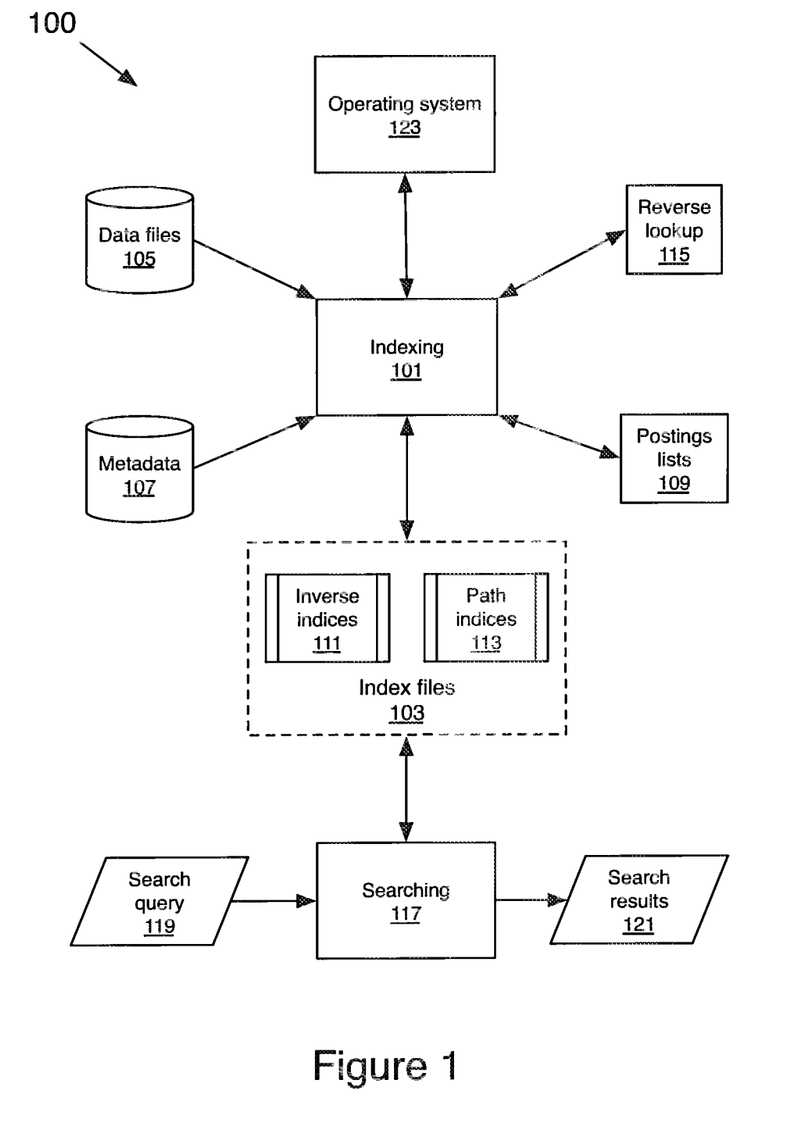
FIG. 1 is a diagram illustrating a overview of the operation of an embodiment a directory tree search.
Figure 4:
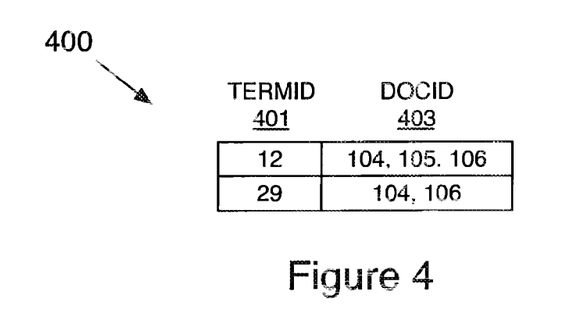
FIG. 4 is a diagram of an inverted index data structure for use in an implementation of the method of FIG. 2 when searching the directory tree structure of FIG. 3.

Beginning with an overview of the operation of directory tree searching, FIG. 1 illustrates one embodiment of a system architecture 100 that includes an indexing system 101 coupled to an operating system (OS) 123. The indexing system 101 is creates and maintains index files 103 that are used by searching system 117 to retrieve files containing terms specified by a search query 119, such as a certain word in a document, and to return the results of the search 121 as a list of files. The indexing system 101 receives information obtained by scanning data files 105 and metadata 107 and uses that information to generate entries in one or more inverted indices 111. Each entry in the inverted index associates a particular term with the data files 105 and metadata 107 that contain the particular term. An embodiment of an inverted index data structure is shown in FIG. 4. It will be appreciated that content files, such image files or music files, can be indexed based on the contents of metadata 107 associated with the content files. Thus, the inverted indices 111 represent at least a subset of the data in a storage device and can include all of the files in a particular storage device (or several storage devices), such as the main hard drive of a computer system. In one embodiment, each inverted index is made read-only after it reaches a pre-determined size and indexing system 101 accumulates new index information in postings lists 109 until the new index information is stored in a new inverted index.

Figure 2:
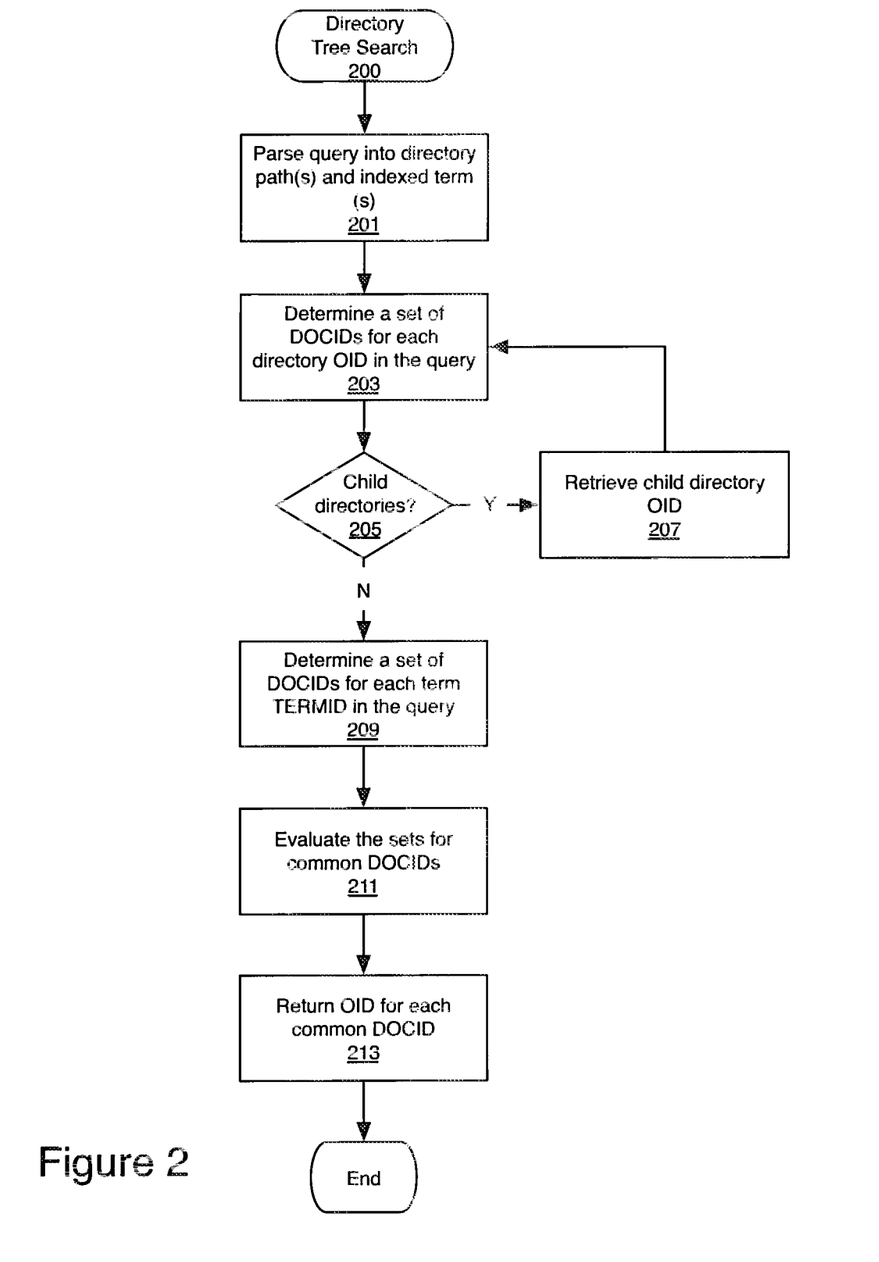
FIG. 2 is an embodiment of a flew diagram of a directory tree search method to be performed by a computer executing indexing software.
Figure 3:
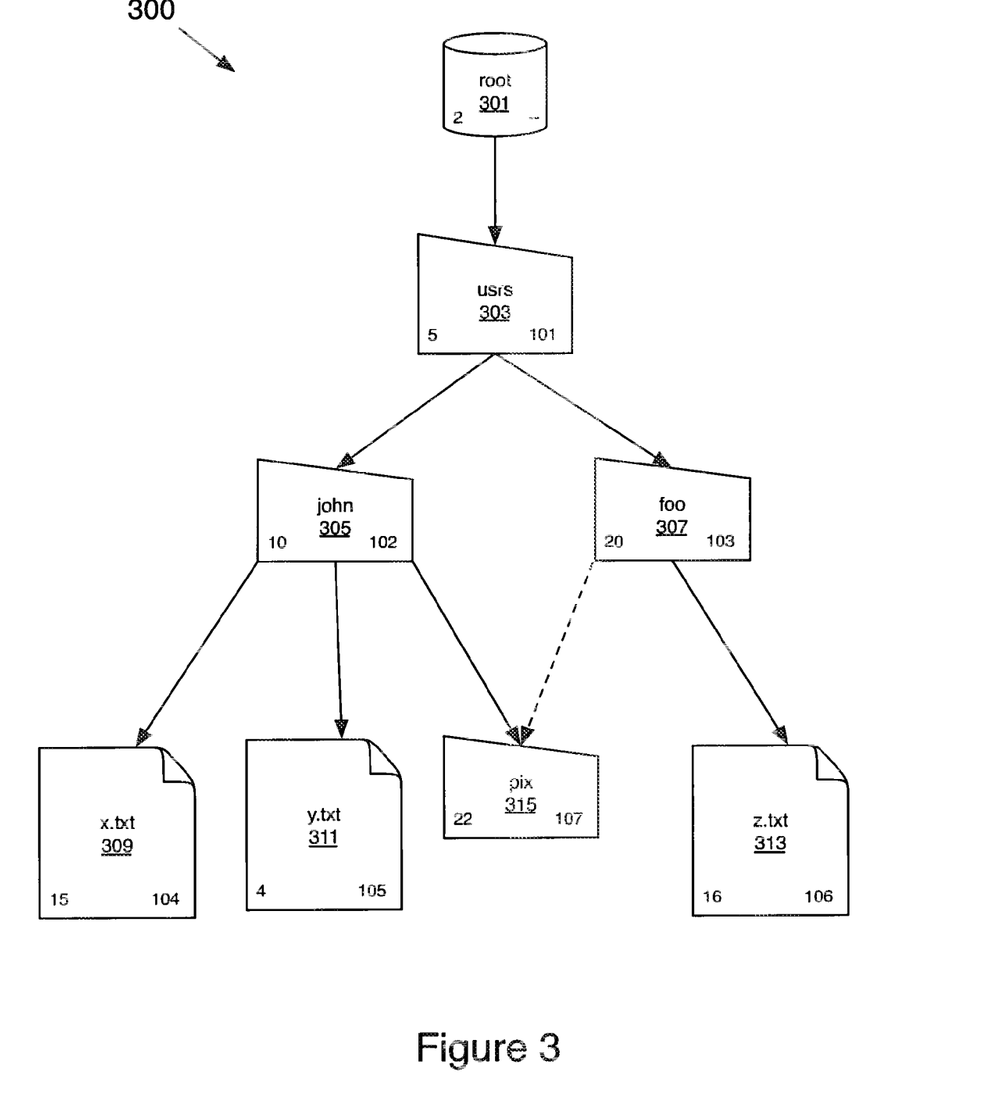
FIG. 3 is a exemplary directory tree structure in a hierarchical file system in an implementation of FIG. 1.
Figure 5:
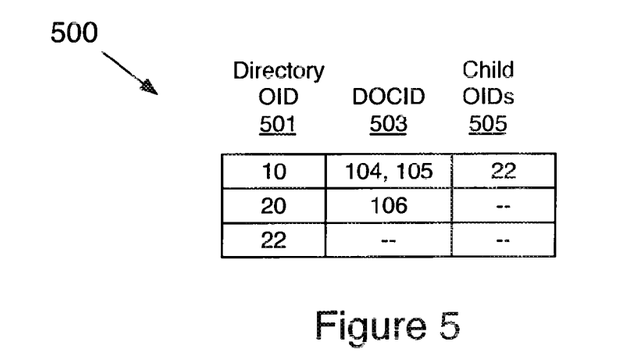
FIG. 5 is a diagram of a path index data structure for use in an implementation of the method of FIG. 2 when searching the directory tree structure of FIG. 3.

The operating system 123 organizes files in a hierarchical file system of parent-child directory relationships, an example of which is shown in FIG. 3. The indexing system 101 creates and maintains one or more path indices 113 that map each directory containing one or more indexed documents to those documents. The indexing system 101 uses the path indices 113 in conjunction with the inverted indices 111 to satisfy a search query 119 without having to request information from the operating system 123, is described below with reference to FIG. 2. An embodiment of a path index data structure is shown in FIG. 5. The indexing system 101 also creates and maintains a reverse lookup data structure 115 that identifies the parent directory for each child directory indexed in the file system. One embodiment of the reverse lookup data structure is shown in FIG. 8 and its use is described in conjunction with FIG. 7.

One embodiment of a directory tree search method 200 that uses the path indices 113 and the inverted indices 111 is described in terms of computer software with reference to a flow chart in FIG. 2 and exemplary inverted index, path index and overlay data structures in FIGS. 3-6. Turning first to FIG. 3, a simplified directory structure 300 in a hierarchical file system is illustrated. Two user directories, "john" 305 and "foo" 307, are child directories to "usrs" directory 303 that, in turn, is a child directory of "root" 301. Directory john 305 logically contains two files, document "x.txt" 309 and document "y.txt" 311. Directory john 305 is also the parent of child directory "pix" 315. Directory foo 307 logically contains a single file, document "z.txt" 313. Each file system object is assigned a unique object identifier (OID) by the operating system 123 and the indexing system 101 assigns a unique document identifier (DOCID) to each object that is indexed. The OID for each object in FIG. 2 is shown in the lower left corner and the DOCID is shown in the lower right hand corner. In addition, the indexing system 101 assigns a unique term identifier (TERMID) to each term that is indexed.

Assume for the purposes of illustration that x.txt, y.txt and z.txt all contain the term "Apple" and the search query is "Find all documents in john's directory that contain the term "Apple." Assume also that the TERMID for APPLE is 12.

Referring now to FIG. 2, the directory tree search method 200 is invoked by the searching system 117 when a search query 119 specifying a directory is received. At processing block 201, the directory tree search method 200 parses the query into a directory path portion and an indexed term portion, i.e., find all documents in directory john 303, and find all documents that contain "Apple." At processing block 203, the method 200 determines a set of DOCIDs for each directory in the query using exemplary path index data structure 500 illustrated in FIG. 5. Each entry in path index 500 comprises a directory OID field 501, a DOCID field 503 and a child OID field 505. Because the OID of directory john 305 is 10, processing block 203 retrieves the DOCIDs 104, 105 from the OID 10 entry in the path index 500, which are the DOCIDs for x.txt and y.txt. If the query requests searching child directories, at decision block 205, the method 200 determines if the child OID field 505 for entry OID 10 in the path index 500 contains a value. In the current example, the method 200 retrieves 22, which is the OID for child directory pix 315 (processing block 207), and returns to processing block 203 to retrieve the DOCIDs from the OID 22 entry in the path index 300. As shown in FIG. 5, there is an entry for OID 22 in the path index but the DOCID field 503 is empty (null). In an alternate embodiment, there would be no entry in the path index 500 for OID 22 as it has no documents that are indexed. In still another embodiment, the child OID field 505 for the OID 10 entry in the path index 500 would be empty.

If there are no more sub-directories under directory john 205, at processing block 209 the method 200 determines a set of DOCIDs for documents in the file system that contain the term "Apple" using an exemplary inverse index 400 illustrated in FIG. 4. Each entry in the inverse index 400 contains a TERMID field 401 and a DOCID field 403. Because the TERMID for Apple is 12, the DOCIDs retrieved from the entry for TERMID 12 are 104, 105 and 106, which are the DOCIDs for x.txt, y.txt, and z.txt. At processing block 211, the method 200 evaluates the two sets for common DOCIDs to find documents that satisfy the full query. In the current example, the method performs an intersection (AND operation) on the two sets to determine that DOCIDs 104, 105 (for documents x.txt and y.txt) satisfy the query. One of skill in the art will immediately recognize that other set operations are used when evaluating other types of queries. At processing block 213, the directory tree search method 200 passes the DOCIDs to the searching system 117 for processing into a list of file names to be output as search results 121.

Figure 6A:
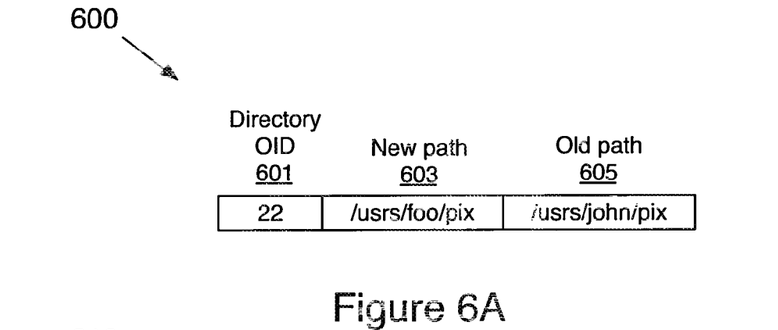
FIGS. 6A-B are diagrams of embodiments of an overlay data structure for use in an implementation of the method of FIG. 2 when searching the directory tree structure of FIG. 3.
Figure 6B:
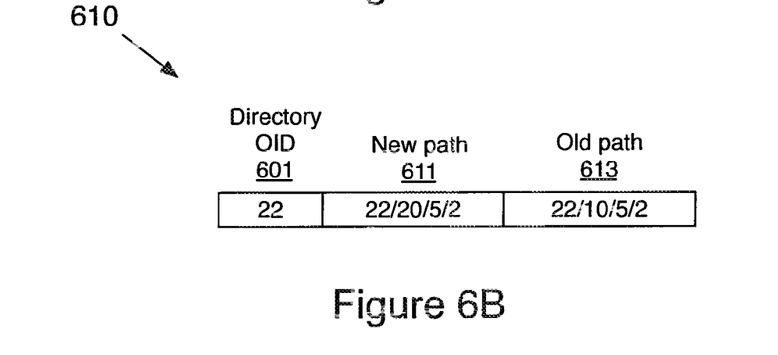

In one embodiment, the path index 500 is generated upon initialization of the indexing system 101 and is made read-only. Updates to paths caused by moves and additions within the file system are stored in an overlay data structure, one embodiment of which is shown in FIG. 6A. Returning now to FIG. 3, assume directory pix 315 has moved from directory john 305 to directory foo 307. The corresponding overlay 600 contains an entry for the directory pix 315. The entry consists of an OID field 601, i.e., 22, a new path field 603, i.e., /usrs/foo/pix, and an old path field 605, i.e., /usrs/john/pix. When the overlay data structure is present, processing block 203 checks the directory OID 22 against the overlay. Because the overlay 600 indicates that directory john 305 no longer owns directory pix 315, it is not necessary for the method 200 to check the directory OID field 501 in the path index 500 for an entry for directory pix since any documents stored in the directory pix are no longer children of directory john. It will be appreciated that the overlay 600 is also be used to change the scope of a search when the query is directed to a directory of which both the old and new paths are children. An alternate embodiment of an overlay data structure 610 is illustrated in FIG. 6B, in which the names in the paths have been replaced by their corresponding OIDs, i.e., new path field 611 is 22/20/5/2 (starting at root 301), which corresponds to /usrs/foo/pix, and old path field 613 is 22/10/5/2, which corresponds to /usrs/john/pix. All subsequent references to overlay 600 encompass overlay 611 as well.

In one embodiment, the overlay 600 is created when a merge or compaction operation is invoked by the indexing system 101. If an index will be both merged and compacted, a single overlay can be used for both operations. The path index 500 is updated with the changes in the overlay 600 when the merge/compaction operation is finished. In one embodiment, the overlay 600 is stored with the path indices 113.

In one embodiment, the overlay 600 is assigned a pointer and access to the overlay by a process (thread) is controlled by read/write locks. Query and reintegration threads take the read lock, while other threads, such as move operations, take the write lock. Reintegration of the overlay 600 into the path index 500 occurs after a merge or compaction operation (whether successful or not) and after crash recovery if the index files 103 were synced to disk (in which case the overlay, or enough information to recreate it, is also synced to disk). A work-queue for move operations is suspended during reintegration. A reintegration thread applies the changes in the overlay entries to the appropriate path index 500 and clear the pointer. The move work-queue is resumed and the reintegration thread posts a work item to the work-queue for each thread that currently has access to the overlay. Once all the work items have been completed, the threads no longer need access to the overlay and the reintegration thread reallocates the overlay. Because the threads during normal processing have to address the overlay using the pointer, clearing the pointer ensures that the overlay cannot be accessed after deallocation.

Use of the overlay allows long running operations a consistent, but not necessarily up-to-date, view of the file system when required without blocking writes to the file system by other threads. Such an operation will access only the path index 500, and reintegration of the overlay and the path index 500 is deferred until the operation completes (or is cancelled).

Figure 7A:
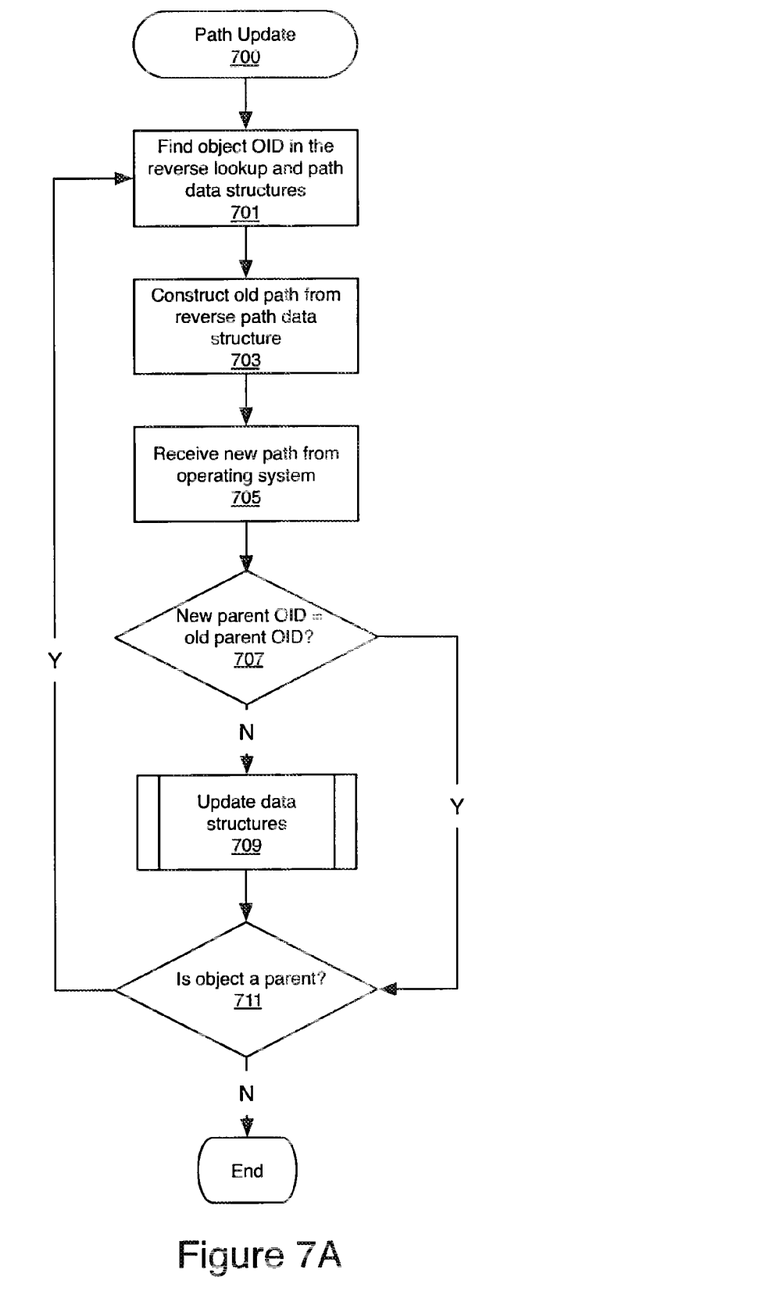
FIGS. 7A-B are flow diagrams of an embodiment of a path update method to be performed by a computer executing indexing software.
Figure 8:
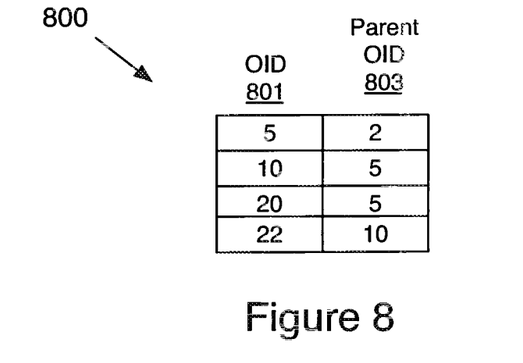
FIG. 8 is a diagram of a reverse lookup data structure for use in an implementation of the method of FIG. 7 when indexing data in the directory tree structure of FIG. 3.
Figure 9:
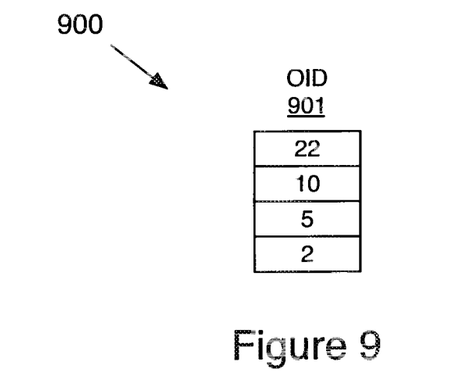
FIG. 9 is a diagram of a reverse path data structure for use in an implementation of the method of FIG. 2 when indexing data in the directory tree structure of FIG. 3.

Turning now to FIG. 7A, a flow chart for one embodiment of a path update method 700 is described with reference to exemplary reverse lookup and reverse path data structures in FIGS. 8 and 9. The reverse lookup data structure 800 contains an entry for each file system object that is indexed. The entry consists of an OID field 801 and a corresponding parent OID field 803. Although illustrated as containing only entries for directories it will be appreciated that the reverse lookup data structure 800 can also contain entries for files. In addition, directories that do not have any indexed child file system objects are treated as if they were files in this respect. Because reverse lookup for files is less frequent than for directories, and other information about the file is often also needed, in one embodiment, the file entries are stored with the other information instead of in the reverse lookup data structure itself. Entries in the reverse path data structure 900 are arranged from the bottom of a path to the top of the path.

Figure 7B:
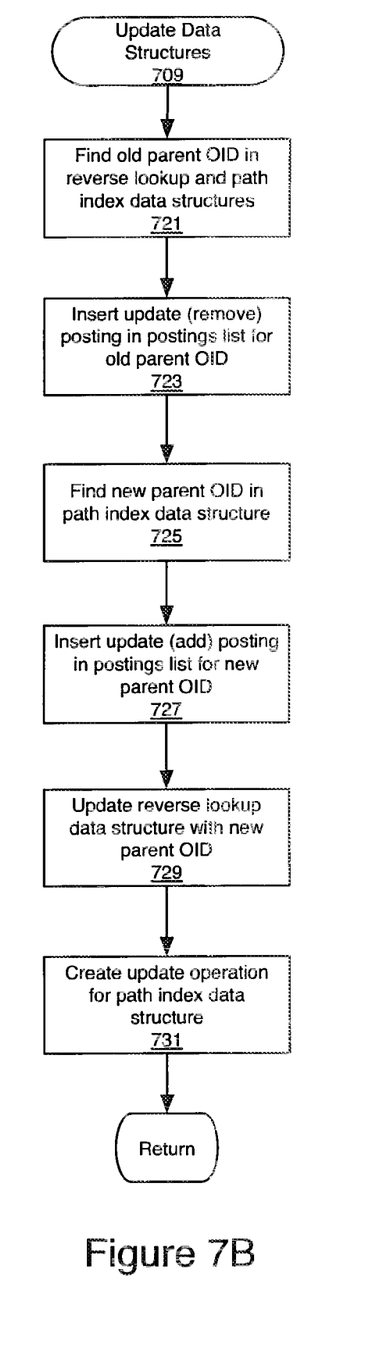

The path update method 700 is invoked by the indexing system 101 when it receives notification from the operating system 123 that a file or directory has moved. At processing block 701, the method 700 finds the entry for the file system object OID, i.e., OID 22 (directory pix) in the reverse lookup data structure 800 and the reverse path data structure 900. Continuing with the example of directory pix 315 moving from directory john 305 to directory foo 307, the old path is stored in the reverse path data structure 900, with the OID for directory pix (22) being the top entry and the OID for root (2) being the bottom entry. The method 700 constructs the old path for directory pix from the reverse path 900, i.e., /usrs/john/pix (processing block 703) and receives the new path for directory pix from the operating system, i.e., /usrs/foo/pix (processing block 705). If the new parent OID is not the same as the old parent OID 803 (decision block 707), at processing block 709, the data structures are updated as shown in FIG. 7B and described below. At processing block 711, the method 700 uses the path index data structure 500 to determine if the file system object OID is a parent of any file system objects. If so, the paths for the corresponding children OIDs are checked for changes starting at processing block 701. If the old and new parent OIDs are the same at decision block 707, the data structures for this file system object do not need to be updated and the method 700 proceeds directly to decision block 711.

FIG. 7B illustrates the operations performed at processing block 709. At processing block 721, the method 700 finds the old parent OID entry, i.e., OID 10 (directory john), in the reverse lookup data structure 800 and path index data structure 500 to determine the postings list for the old parent object and places a update (remove) posting in that postings list (processing block 723). At processing block 725, the method 700 uses the new path information provided by the operating system 123 to find the OID for the new parent object, i.e., OID 20 (directory foo), in the path index data structure 500. An update (add) posting is placed in the postings list associated with the new parent OID (processing block 727). At processing block 729, the parent OID field 803 entry for the moved file system object, i.e., OID 22 (directory pix), in the reverse lookup data structure 800 is changed to the new parent OID, i.e., from OID 10 (directory john), to OID 20 (directory foo). A corresponding update operation is created for the path index data structure 500 (which may be recorded in an overlay if one is being used) at processing block 731.

In one embodiment, the data structures illustrated in FIGS. 4-5 and 8-9 are tables having one field designated as a key, such as directory OID field 501 for path index 500, and entries in the tables are found by hashing the key value. Hashing techniques are well-known in the art and therefore are not described in further detail. Alternate embodiment in which the tables are implemented as b-trees, tries/radix tees or other well-known data structures that support key/value lookup, including a linked list or array using linear traversal, will be readily contemplated by one of skill in the art.

Figure 10:
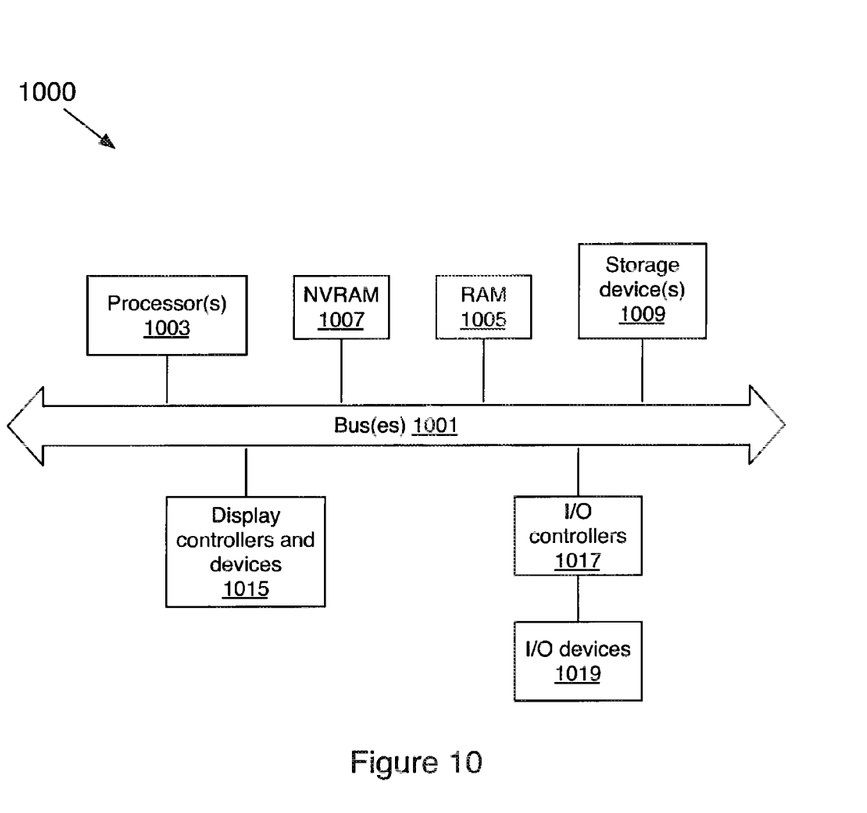
FIG. 10 is a diagram of a computer environment suitable for practicing directory free searching as disclosed herein.

FIG. 10 illustrates an example of a typical computer system in which directory tree searching as described herein can be implemented. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components can also be used with the present invention. The computer system of FIG. 10 can, for example, be a Macintosh computer from Apple Inc.

As shown in FIG. 10, the computer system 1000, which is a form of a data processing system, includes a bus 1001 which is coupled to processor(s) 1003 and NVRAM (non-volatile random access memory) 1007, RAM 1005, and storage devices 1009. The bus 1001 interconnects these various components together and also interconnects these components 1003, 1007, 1005, 1009 to a display controller and display device 1015, and to peripheral devices such as input/output (I/O) devices 1019, which can be mice, keyboards, modems, network interfaces, printers and other devices which are well known in the art. Typically, the input/output devices 1019 are coupled to the system through input/output controllers 1017. The RAM 1005 is typically implemented as dynamic RAM (DRAM), which requires power continually in order to refresh or maintain the data in the memory.

The storage device 1009 is typically a hard drive or an optical drive or other storage devices that maintain data (e.g. large amounts of data) even after power is removed from the system. While FIG. 10 shows that the storage device 1009 is local device coupled directly to the rest of the components in the data processing system 1000, it will be appreciated that the write and destroy operations can be performed on a storage device coupled remotely to the system 1000, such as a network storage device that is coupled to the data processing system through a network interface such as a wireless or Ethernet interface. The bus 1001 can include one or more buses connected to each other through various bridges, controllers and/or adapters as is well known in the art. In one embodiment, the I/O controller 1017 includes a USE (Universal Serial Bus) adapter for controlling USB peripherals and an IEEE 1394 controller for IEEE 1394 compliant peripherals.

The description of FIG. 10, is intended to provide an overview of computer hardware and other operating components suitable for implementing the write and destroy operations, but is not intended to limit the applicable environments. It will be appreciated that the computer system 400 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Directory tree searching has been described. Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention.

For example, the methods 200 and 700 constitute computer programs made up of machine-executable instructions illustrated as processing blocks in FIGS. 2 and 7. Describing the methods by reference to a flow diagram enables one skilled in the art to develop such programs including such instructions to carry out the methods on suitably configured machines (the processor of the machine executing the instructions from machine-readable media, including memory) The machine-executable instructions can be written in a computer programming language or can be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages can be used to implement the teachings of the invention as described herein. Furthermore, it is common in the art to speak of software, in one form or another (e.g., program, procedure, process, application, module, as taking an action or causing a result. Such expressions are merely a shorthand way of saying that execution of the software by a computer causes the processor of the computer to perform an action or produce a result. It will be appreciated that more or fewer processes can be incorporated into the methods illustrated in FIGS. 2 and 7 without departing from the scope of the invention and that no particular order is implied by the arrangement of blocks shown and described herein.

The terminology used in this application with respect to file systems is meant to include all operating system environments that organize data into hierarchical directory structure. Therefore, it is manifestly intended that this invention be limited only by the following claims and equivalents thereof.

What is claimed is:

1. A method comprising:
parsing a search query into a directory path portion and an indexed term portion, the directory path portion comprising a directory specified by a user in the search query and the indexed term portion comprising a term specified by the user in the search query;
determining a first set of document identifiers for each directory in the directory path portion using a path index, the path index comprising path entries, each path entry including a directory identifier, a document identifier, and a child identifier used to recursively search child directories when specified by the search query;
determining a second set of document identifiers for each term in the indexed term portion using an inverted index, the inverted index comprising term entries, each term entry including a term identifier and a document identifier; and
evaluating the sets for common document identifiers, the common document identifiers forming a third set of document identifiers corresponding to documents that are a result of the search query.

2. The method of claim 1, wherein evaluating comprises performing a set operation on the sets.

3. The method of claim 2, wherein the set operation is an intersection.

4. The method of claim 1 further comprising:
determining a set of document identifiers for a child directory in the directory path portion using the path index.

5. The method of claim 1, wherein determining a set of document identifiers for each directory in the path portion comprises:
retrieving the document identifiers from an entry in the path index, each entry being associated with one directory.

6. The method of claim 1, wherein determining a set of document identifiers for each directory in the path portion comprises:
searching an overlay data structure for changes to directory paths, the overlay data structure comprising a directory identifier, a new directory path and an old directory path corresponding to a directory with a changed directory path; and
excluding a document identifier from the set if a corresponding entry in the overlay data structure contains a new directory path that does not match the directory path portion of the search query.

7. The method of claim 6 further comprising:
reintegrating the overlay data structure into the path index by applying the changes in the overlay data structure.

8. The method of claim 6 further comprising:
controlling access to the overlay data structure using read and write locks.

9. The method of claim 1 further comprising:
updating the path index using a reverse lookup data structure and a reverse path data structure, each entry in the reverse lookup data structure comprising a child object identifier and a parent object identifier, and each entry in the reverse path data structure comprising object identifiers for each file system object in a directory path.

10. The method of claim 9 further comprising:
updating the reverse lookup data structure using the reverse path data structure when a directory path changes.

11. A non-transitory machine-readable storage medium having stored thereon executable instructions to cause a processor to perform operations comprising:
generating two sets of document identifiers using a path index and an inverted index, a first set containing document identifiers for each directory specified by a user in a search query and a second set for each term specified by the user in the search query, wherein the path index comprises path entries, each path entry including a directory identifier, a document identifier, and a child identifier used to recursively search child directories when specified by the search query, and the inverted index comprises term entries, each term entry including a term identifier and a document identifier; and
determining common document identifiers in the two sets, the common document identifiers forming a third set of documents corresponding to documents that are a result of the search query.

12. The non-transitory machine-readable storage medium of claim 11, wherein creating the first set of document identifiers comprises:
finding the document identifiers in the path index, each entry in the path index being associated with one directory.

13. The non-transitory machine-readable storage medium of claim 11, wherein creating the first set of document identifiers comprises:
filtering document identifiers using an overlay containing changes to directory paths, the overlay comprising a directory identifier, a new directory path and an old directory path corresponding to a directory with a changed directory path.

14. The non-transitory machine-readable storage medium of claim 13, wherein the operations further comprise:
applying the changes in the overlay to the path index.

15. The non-transitory machine-readable storage medium of claim 11, wherein the operations further comprise:
creating an update operation for the path index when a parent object for a child object in a reverse lookup table changes.

16. A system comprising:
a processor coupled to a memory through a bus, and further coupled to an input/output interface; and
an indexing process executed from the memory by the processor to cause the processor to
receive a search query through the input/output interface, the search query comprising a directory specified by a user and a term specified by the user;
search a path index for document identifiers that correspond to the directory specified in the search query to generate a first set of document identifiers, the path index comprising path entries, each path entry including a directory identifier, a document identifier, and a child identifier used to recursively search child directories when specified by a search query;
search an inverted index for document identifiers that correspond to the term specified in the search query to generate a second set of document identifiers, the inverted index comprising term entries, each term entry including a term identifier and a document identifier; and
generate a third set of document identifiers comprising document identifiers common to the first set for the path index and the second set for the inverted index, the third set of document identifiers corresponding to documents that are a result of the search query.

17. The system of claim 16, wherein the indexing process further causes the processor to determine a document identifier has a parent directory that is not specified in the search query as a result of a path change using an overlay that records path changes, the overlay comprising a directory identifier, a new directory path and an old directory path corresponding to a directory with a changed directory path.

18. The system of claim 17, wherein the indexing process further causes the processor to update the path index with the changes in the overlay.

19. The system of claim 16, wherein the indexing process further causes the processor to execute an update operation on the path index when a parent object for a child object in a reverse lookup table changes.

20. An apparatus comprising:
means for indexing document identifiers for directories according to paths in a file system, the means for indexing document identifiers for directories comprising path entries, each path entry including a directory identifier, a document identifier, and a child identifier used to recursively search child directories when specified by a search query;
means for indexing document identifiers for terms in documents stored in directories in the file system, the means for indexing document identifiers for terms comprising term entries, each term entry including a term identifier and a document identifier;
means for receiving a search query, the search query comprising a directory specified by a user and a term specified by the user; and
means for generating a result of the search query, wherein the means for generating determines a third set of common document identifiers in a first set and a second set of document identifiers, the first set comprising document identifiers in the means for indexing the document identifiers for directories and the second set comprising document identifiers in the means for indexing the document identifiers for terms corresponding to the directories and terms in the search query, the third set of common document identifiers corresponding to documents that are a result of the search query.

21. The apparatus of claim 20 further comprising:
means for recording changes to paths in the file system, the means for recording changes comprising a directory identifier, a new directory path and an old directory path corresponding to a directory with a changed directory path, wherein the means for generating excludes a document identifier from the result if a corresponding path in the means for recording is not specified in the search query.

22. The apparatus of claim 21 further comprising:
means for reintegrating the changes in the means for recording into the means for indexing document identifiers for directories.

23. The apparatus of claim 20 further comprising:
means for reverse lookup that stores object identifiers and corresponding parent object identifiers for file system paths; and
means for updating the indexing document identifiers for directories when the means for reverse lookup changes.

* * * * *